United States Patent
Nelson et al.

(10) Patent No.: US 11,895,270 B2
(45) Date of Patent: Feb. 6, 2024

(54) PHONE TREE TRAVERSAL SYSTEM AND METHOD

(71) Applicant: LENOVO (SINGAPORE) PTE. LTD, New Tech Park (SG)

(72) Inventors: Lindsay Nelson, Highlands Ranch, CO (US); Sathish Kumar Ganesan, Tampa, FL (US); Matthew Fardig, Boonville, IN (US); Dane Hixson, Eden, UT (US)

(73) Assignee: LENOVO (SINGAPORE) PTE. LTD, New Tech Park (SG)

( * ) Notice: Subject to any disclaimer, the term of this patent is extended or adjusted under 35 U.S.C. 154(b) by 0 days.

(21) Appl. No.: 17/651,482

(22) Filed: Feb. 17, 2022

(65) Prior Publication Data
US 2023/0262166 A1 Aug. 17, 2023

(51) Int. Cl.
*H04M 3/51* (2006.01)
*H04M 3/523* (2006.01)

(52) U.S. Cl.
CPC ....... *H04M 3/5166* (2013.01); *H04M 3/5235* (2013.01); *H04M 2201/39* (2013.01)

(58) Field of Classification Search
CPC ............. H04M 3/5166; H04M 3/5235; H04M 2201/39
See application file for complete search history.

(56) References Cited

U.S. PATENT DOCUMENTS

| | | | | |
|---|---|---|---|---|
| 6,904,143 | B1* | 6/2005 | Peterson | H04M 3/42221 379/265.06 |
| 6,922,466 | B1* | 7/2005 | Peterson | H04M 3/5175 379/265.06 |
| 10,034,174 | B1* | 7/2018 | Tuomikoski | H04W 12/06 |
| 10,172,007 | B1* | 1/2019 | Tuomikoski | H04M 3/42059 |
| 10,506,401 | B1* | 12/2019 | Tuomikoski | H04M 3/382 |
| 10,979,568 | B1* | 4/2021 | Lu | G06F 3/04817 |
| 2010/0226489 | A1* | 9/2010 | Sarkar | H04M 3/5166 379/265.09 |
| 2013/0177144 | A1* | 7/2013 | Forsee | H04M 3/5166 379/88.22 |
| 2021/0160371 | A1* | 5/2021 | Mcgann | H04M 3/5175 |
| 2022/0109753 | A1* | 4/2022 | Baror | H04M 3/42068 |

* cited by examiner

*Primary Examiner* — Akelaw Teshale
(74) *Attorney, Agent, or Firm* — Dean D. Small; The Small Patent Law Group, LLC

(57) ABSTRACT

A phone tree traversal system includes an input device configured to receive a user call request, a memory, and one or more processors. The one or more processors analyze the user call request to identify an entity to call and an objective of the call, and obtain a map of a phone tree utilized by an automated call receiving system of the entity. The phone tree includes at least one node with multiple path segments that branch from the node, and each node includes a respective prompt. The one or more processors determine a route along the map to an endpoint of the phone tree associated with the objective. During the call, the one or more processors navigate the phone tree to reach the endpoint by submitting information in response to the respective prompt at each node along the route that is determined.

20 Claims, 3 Drawing Sheets

PHONE TREE TRAVERSAL SYSTEM AND METHOD

FIELD

The present disclosure relates generally to navigating automated telephone call receiving systems that utilize menus to direct incoming calls.

BACKGROUND OF THE INVENTION

Some business entities utilize automated systems that receive incoming telephone calls. The automated call receiving systems communicate with the caller using recorded or computer-generated prompts, and the caller responds by pressing phone keys or voice responses of words or short phrases. The responses provided by the caller are used by the automated system to navigate a menu for directing the caller to a more specific department or individual of the business entity. The menu may have multiple tiers of prompts for information and/or decisions, referred to herein as a phone tree. Such automated systems can be more efficient and economical for the business entity than using a human operator to receive and route incoming calls.

Communicating with automated call receiving systems to accomplish a desired task (e.g., check a balance, update personal information, reach a specific individual or department, etc.), however, can be a difficult, time-consuming, and/or frustrating experience for callers. For example, people with disabilities and/or elderly individuals may struggle with hearing the prompts and successfully submitting responses to the prompts within designated time limits of the automated systems. The failure to submit a response within a time limit may cause the automated system to repeat the prompt, return to a previous prompt, route the caller to a undesired extension, or terminate the call. Callers that have no difficulty hearing and responding to the automated prompts may still experience confusion and frustration. For example, it may not be obvious to a caller which of the menu options (e.g., branches of the phone tree) will route the call towards the caller's desired objective. The caller may become frustrated waiting an extended period of time for the automated system to list different options, particularly if the caller is forced to repeat the phone tree navigation multiple times due to submitting incorrect information, failing to submit information within the designated time limit, and/or traversing through the phone tree along an incorrect route that does not lead to the caller's objective.

A need remains for improving the caller experience with automated call receiving systems of entities by automating the process of navigating phone trees.

SUMMARY

In accordance with an embodiment, a phone tree traversal system is provided that includes an input device configured to receive a user call request, a memory configured to store program instructions, and one or more processors operably connected to the memory. The program instructions are executable by the one or more processors to analyze the user call request to identify an entity to call and an objective of the call, and obtain a map of a phone tree utilized by an automated call receiving system of the entity to direct incoming calls to different extensions of the entity. The phone tree includes at least one node with multiple path segments that branch from the node, and each node includes a respective prompt. The program instructions are executable by the one or more processors to determine a route along the map to an endpoint of the phone tree associated with the objective of the call. The route extends through the at least one node. During the call with the entity, the program instructions are executable by the one or more processors to navigate the phone tree to reach the endpoint by submitting information in response to the respective prompt at each node along the route that is determined.

Optionally, during the call and in response to the respective prompt, the one or more processors may submit at least some of the information to the automated call receiving system without input from a user. The one or more processors may execute the program instructions to generate the map by performing one or more training calls to the entity, prior to the call, to traverse different available routes through the phone tree. The one or more processors may execute the program instructions to obtain the map by retrieving the map of the phone tree utilized by the entity from an entity database that includes multiple maps of different phone trees associated with different entities.

Optionally, the phone tree traversal system may also include a communication device configured to make telephone calls, and the one or more processors execute the program instructions to control the communication device to initiate the call with the entity by obtaining a phone number associated with the entity. Optionally, the input device includes a microphone, and the user call request may be provided by voice to the microphone. The one or more processors may transcribe audio of the user call request to text and analyze the text to identify the entity to call and the objective of the call.

Optionally, during the call the respective prompt may be received as an audio signal of computer-generated speech or pre-recorded speech, and the one or more processors may interpret the audio signal and determine an element of information that is requested by the respective prompt. The one or more processors may search for the element of information within a memory device, and in response to finding the element of information within the memory device, may automatically submit the element of information. The one or more processors may search for the element of information within a memory device, and in response to not finding the element of information within the memory device, may generate a control signal to prompt a user to input the element of information using the input device or another input device.

Optionally, upon reaching the endpoint of the phone tree, the one or more processors may one or more of establish an audio connection with an audio device to enable the user to participate in the call, schedule an event with the automated call receiving system, collect information from the automated call receiving system, or update information stored by the entity.

In accordance with an embodiment, a method is provided that includes analyzing, via one or more processors, a user call request received via an input device to identify an entity to call and an objective of the call. The method includes obtaining a map of a phone tree utilized by an automated call receiving system of the entity to direct incoming calls to different extensions of the entity. The phone tree includes at least one node with multiple path segments that branch from the node, and each node includes a respective prompt. The method includes determining a route along the map to an endpoint of the phone tree associated with the objective of the call. The route extends through the at least one node. During the call with the entity, the method includes navigating the phone tree to reach the endpoint by submitting information in response to the respective prompt at each node along the route that is determined.

Optionally, navigating the phone tree comprises retrieving at least some of the information from a user database in response to the respective prompt and submitting the information to the automated call receiving system without user input. The method may also include generating the map of the phone tree by performing one or more training calls to the entity prior to the call. Optionally, obtaining the map of the phone tree includes retrieving the map of the phone tree utilized by the entity from an entity database that includes multiple maps of different phone trees associated with different entities.

Optionally, the respective prompt may be received as an audio signal of computer-generated speech or pre-recorded speech, and the method may include interpreting the audio signal and determining an element of information that is requested by the respective prompt. The method may include searching for the element of information within a user database. In response to finding the element of information within the user database, the method includes automatically submitting the element of information to the automated call receiving system. In response to not finding the element of information within the user database, a control signal is generated to prompt a user to input the element of information using the input device or another input device.

Optionally, upon reaching the endpoint of the phone tree, the method includes one or more of establishing an audio connection with an audio device to enable the user to participate in the call; scheduling an event with the automated call receiving system; collecting information from the automated call receiving system; or updating information stored by the entity.

In accordance with an embodiment, a computer program product having a non-transitory computer readable storage medium is provided. The non-transitory computer readable storage medium includes computer executable code configured to be executed by one or more processors to analyze a user call request received via an input device to identify an entity to call and an objective of the call. The computer executable code is also executed by the one or more processors to obtain a map of a phone tree utilized by an automated call receiving system of the entity to direct incoming calls to different extensions of the entity. The phone tree includes at least one node with multiple path segments that branch from the node, and each node includes a respective prompt. The computer executable code is executed by the one or more processors to determine a route along the map to an endpoint of the phone tree associated with the objective of the call. The route extends through the at least one node. During the call with the entity, the computer executable code is executed by the one or more processors to navigate the phone tree to reach the endpoint by submitting information in response to the respective prompt at each node along the route that is determined.

Optionally, the computer executable code may be executed by the one or more processors to retrieve at least some of the information from a user database in response to the respective prompt and submit the information to the automated call receiving system without user input. The computer executable code may be executed by the one or more processors to determine the route along the map to the endpoint of the phone tree prior to the call.

DETAILED DESCRIPTION

Figure 1:
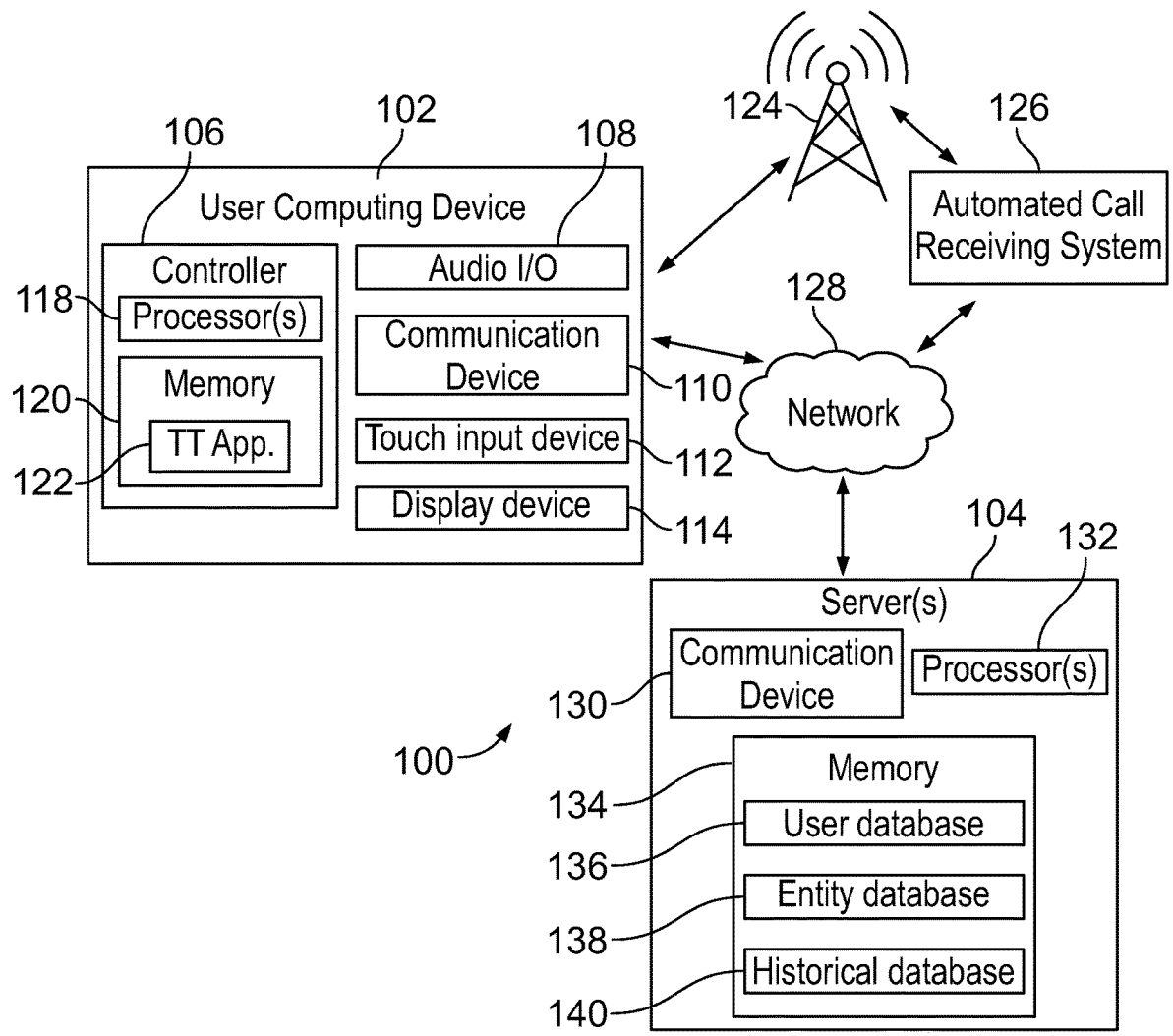
FIG. 1 is a block diagram of a phone tree traversal system according to an embodiment.

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

Embodiments described herein disclose a phone tree traversal system that navigates multi-tiered menus, or phone trees, of automated call receiving systems. The phone tree traversal system may assist users by traversing the phone tree of an entity to reach an objective of the user. Example objectives may include checking an account balance, scheduling an appointment or reservation, updating personal information, speaking with a representative or agent, and the like. In an example embodiment, when a call is placed to an entity, the phone tree traversal system responds to prompts from the automated call receiving system of the entity. The phone tree traversal system responds to the prompts by submitting information that is satisfactory to proceed through the phone tree along a route that reaches an endpoint in the phone tree associated with the objective of the call. The system analyzes the phone tree of the entity before the call to determine the route through the phone tree that would reach the endpoint.

The phone tree traversal system operates by automatically interpreting the prompts, retrieving information from one or more databases that correspond to the respective prompts and the user, and submitting the information that is retrieved to the automated call receiving system via the telephone communication link during the call. In at least one embodiment, the phone tree traversal system operates autonomously such that the user does not participate in the call, at least until the phone tree traversal system reaches the objective. When traversing the phone tree, the phone tree traversal system may only request input from the user in limited circumstances, such as to provide information that is not stored in a database accessible to the system, due to a sensitive nature of the information or the like. Another limited circumstance in which the phone tree traversal system may request input from the user is if the system is not able to successfully traverse a node of the phone tree, either due to difficulty interpreting the prompt, outdated information that the system submits in response to the prompt, or the like.

By utilizing the phone tree traversal system to navigate phone trees of entities on a user's behalf, the user beneficially avoids devoting time and attention to listen and respond to the individual prompts. The user also avoids confusion associated with which options should be selected to achieve the desired objective of the call. Furthermore, the user is not rushed to submit responses within a designated time limit. The phone tree traversal system can be utilized as a tool for any user to save time and avoid the frustration of dealing with automated call receiving systems, and has particular utility for users that struggle to successfully navigate automated phone trees due to disability, age, or the like.

References herein to "machine learning" refer to artificial intelligence algorithms that learn from various automatic or manual feedback, such as observations and/or data. The artificial intelligence algorithms may be adjusted over multiple iterations based on the observations and/or data. For example, the artificial intelligence algorithms may be adjusted by supervised learning, unsupervised learning, and/or reinforcement learning (e.g., customer feedback). Non-limiting examples of artificial intelligence algorithms include decision trees, K-means, deep learning, artificial neural networks, and/or the like.

The term "calls" as used herein includes telephone calls, such as calls initiated by cellular telephones that wirelessly communicate with cell towers and calls initiated by conventional wired telephones (e.g., landlines). Optionally, at least one party of a call may not be a conventional wired or wireless telephone, but rather a computing device that has a network connection. For example, a user may utilize a laptop computer, tablet computer, desktop computer, or even a wearable computer (e.g., smartwatch) to initiate and carry out a call to a business entity, such as using a voice over internet protocol (VoIP) or another network-based communication protocol.

FIG. 1 is a block diagram of a phone tree traversal system 100 (PTT system) according to an embodiment. The PTT system 100 may include components from a user computing device 102 and one or more servers 104 that are external and remote from the user computing device 102. The PTT system 100 assists a user by navigating a menu of an automated call receiving system 126 to accomplish a desired task or objective for the user, as described herein, such that the user is not relied upon to make decisions and submit information in response to every prompt by the automated call receiving system 126.

The user computing device 102 includes a controller 106, and audio input and output device 108, a communication device 110, a touch (or tactile) input device 112, and a display device 114. These components may be commonly held within or on a housing or case of the user computing device 102. The user computing device 102 may have additional components that are not shown in FIG. 1. The user computing device 102 may be a smartphone, a tablet computer, a laptop computer, a hands-free, audio speaker device (e.g., a digital assistant device), a desktop computer, a wearable computer, or the like. In an alternative embodiment, the user computing device 102 may lack one or more of the components shown in FIG. 1. For example, a digital assistant device may lack a display.

The controller 106 is operably connected to the other components of the user computing device 102 via wired and/or wireless communication links. The controller 106 represents hardware circuitry that includes and/or is connected with one or more processors 118 (e.g., one or more microprocessors, integrated circuits, microcontrollers, field programmable gate arrays, etc.). The controller 106 includes and/or is connected with a tangible and non-transitory computer-readable storage medium, referred to herein as memory 120. The memory 120 may store programmed instructions (e.g., software) that are executed by the one or more processors 118 to perform the phone tree traversal operations described herein. For example, the programmed instructions may include a phone tree traversal algorithm that is performed at least in part by the controller 106, and details of the algorithm are described herein with reference to the flow chart of FIG. 3. For example, the one or more processors 118 of the controller 106 may respond to a user call request by executing the program instructions, representing the phone tree traversal algorithm, stored in the memory 120. The memory 120 may store additional applications, such as various application program interfaces (APIs) that link to a cloud hosting service.

In an embodiment, the program instructions that relate to the phone tree traversal algorithm may be packaged in a phone tree traversal application (referred to herein as "TT application") 122 stored in the memory 120. Optionally, a user may selectively activate or "open" the TT application 122 on the user computing device 102 before submitting the user call request. The TT application 122 may include a graphical user interface (GUI) that enables the user to visually interact with the phone tree traversal system, such as by submitting text to sign in to the TT application 122, submitting text to generate the user call request or to command the application 122 to "listen" for a spoken user call request, selecting virtual buttons on the GUI, and/or the like. Optionally, the TT application 122 may manage operation of one or more other components of the user computing device 102 to parse the spoken or text-based words of the user call request, analyze the request to determine content of the request, and communicate with appropriate web-based services (e.g., cloud hosting services) based on the content of the user call request. The TT application 122 may also manage the operation of the audio input and output device 108 during the call to an entity according to the user call request. For example, the TT application 122 uses the input of the audio device 108 to receive audio signals that represent prompts from the automated call receiving system 126 of the entity. After analyzing the audio signals to determine the information that is requested by each prompt, the TT application 122 may control the output of the audio device 108 to provide the information to the automated call receiving system 126.

The communication device 110 represents hardware circuitry that can communicate electrical signals via wireless communication pathways and/or wired or conductive pathways. The user computing device 102 may utilize the communication device 110 to communicate messages with the automated call receiving system 126 of the entity via a cellular tower 124 and/or through a network 128. The communication device 110 can include transceiving circuitry, one or more antennas, and the like, for wireless communication, such as to the cellular tower 124 and/or to a modem or router. The transceiving circuitry may include a transceiver or a separate transmitter and receiver. The electrical signals can form data packets that in the aggregate represent messages. The communication device 110 may be communicatively connected to the network 128 via a wired or wireless communication link to a modem and/or router that is connected to the network 128. The communication device 110 may communicate with the one or more remote servers 104 and various web services in the cloud via the network 128. The communication device 110 can transmit or broadcast messages during a call with the automated call receiving system 126 of the entity. The communication device 110 may receive messages and forward the messages to the controller 106 for analysis.

The audio input and output device 108 may include one or more microphones that receive audio and convert soundwaves into electrical signals via transducers. The one or more microphones may include amplifiers, filters, and/or the like for conditioning the signals conveyed to the controller 110. The user computing device 102 uses the microphones to receive speech inputs, such as voice commands, spoken user call requests, and the audio to be communicated to the other party during a call. Optionally, the microphones may also be used to monitor for a designated sound and/or sound pattern used to wake the user computing device 102 and/or the TT application 122 from a sleep mode. For example, the designated sound and/or sound pattern that functions as the wake trigger may be a proper name. The output of the audio device 108 may include one or more speakers and associated circuitry such as drivers, amplifiers, and the like. The audio output generates and emits sounds that emit the voice of the other party during a call. If additional information is needed to successfully navigate the prompts of a phone tree, the phone tree traversal system 100 may use the audio output to emit one or more sounds to notify the user about the need for additional information.

The touch input device 112 may include one or more buttons, switches, touch sensitive screens and/or pads, and/or the like. In an example, the touch input device 112 can include a physical keyboard (with discrete three-dimensional keys) or a virtual keyboard on a touch screen. The user can utilize the physical and/or virtual keyboard to input text-based information and commands to the user computing device 102 (and the TT application 122).

The display device 114 includes a display screen that presents graphical indicia, such as text and symbols, for viewing by the user. The display device may display the GUI of the TT application 122 on the display screen.

The one or more remote servers 104 may provide cloud-based services, such as data storage. The one or more remote servers 104 may be located at a computing facility, data storage facility, or the like. The remote server(s) 104 may include a communication device 130, one or more processors 132, and a tangible and non-transitory computer-readable storage medium, referred to herein as memory 134. The communication device 130 enables the remote server(s) to send and receive messages with the user computing device 102 via the network 128. For example, the controller 106 of the user computing device 102 may communicate with the remote server(s) 104 to perform the phone tree traversal method described herein. In an embodiment, the remote server(s) 104 may be communicatively connected to multiple different user computing devices of different users. Allocating resources of the phone tree traversal system 100 at the remote server(s) 104 may enable efficient aggregation and analysis of information collected from multiple different users, which can be used to improve the performance of the phone tree traversal system 100. For example, if one user computing device 102 generates a map of a phone tree of a particular entity by placing one or more calls to the entity and navigating through the menu, the map of the phone tree that is generated may be stored at the remote server(s) 104 for use by other user computing devices in the future, such that the other computing devices do not need to generate the map.

The communication device 130 may have similar hardware circuitry as the communication device 110 of the user computing device 102. Optionally, the communication device 130 at the server 104 may be wired to a network router or modem. The one or more processors 132 of the remote server(s) 104 may be used to analyze the content of messages received by the communication device 130, and search through information stored in the memory 134 based on the analysis. The processors 132 may include one or more microprocessors, integrated circuits, microcontrollers, field programmable gate arrays, and/or the like. The memory 134 may store programmed instructions (e.g., software) that are executed by the one or more processors 132 to perform the tasks described herein, such as tasks related to storing information in databases of the memory 134 and retrieving information from the databases.

In an embodiment, the memory 134 of the remote server(s) 104 includes a user database 136 which stores information about known users of the phone tree traversal system 100 (e.g., the TT application 122). The user database 136 may include user account information, personal information for submitting to the automated call receiving systems 126 of business entities during a call, and the like. The user account information may include an account number, user name, password, user settings, and/or the like, that is used to identify and track users of the phone tree traversal system 100. For example, a user may be required to log in to the TT application 122 prior to submitting a user call request for the system 100 to place a call to an entity. During log in, information submitted by the user may be compared to the user account information on file to verify the identity of the user. The personal information of the user refers to information that may be necessary to supply to an automated call receiving system 126 in response to prompts during a call in order to traverse the phone tree. Such personal information may include the user's first name, last name, middle name, date of birth, residence address, phone number, social security number or last four digits thereof, and the like. The user personal information may include data that is specific to different business entities with which the user has a relationship. For example, the user personal information may include account numbers, personal identification numbers (PINs), answers to security questions, and the like, that are specific to each of multiple different entities (e.g., bank, credit card company, hair salon, etc.). When prompted for information by the automated call receiving system 126 during a call, the controller 106 of the user computing device 102 may communicate with the remote server(s) 104 to search through the user database 136 for information that would successfully answer the prompt.

The entity database 138 stores information specific to different business entities to which the phone tree traversal system 100 may place calls. The entity information can include contact information and phone tree information. The contact information can include the name of the entity (e.g., any other entity identification information) and the phone number for reaching the automated call receiving system 126 of the entity. The contact information optionally also includes an address, working hours, and/or other basic information about an entity. The phone tree information includes maps of phone trees of the entity automated call receiving systems 126. Each map of a phone tree stored in the database 138 may be received from the corresponding entity itself (e.g., the entity may publish the phone tree) or may be generated by one of the user computing devices 102 that performs one or more training (or test) calls to the entity to explore and document the menu of the entity. In an embodiment, in response to determining an entity that represents the intended recipient of a call, the phone tree traversal system 100 may access the entity database 138. If the intended recipient matches with an entity that is stored in the database 138, the phone tree traversal system 100 retrieves the phone number and the map of the phone tree of the entity. As used herein, "retrieval" of information from a database may include generating a temporary copy of the information such that the original information is not removed from the database or otherwise modified.

The historical database 140 may include a record or log of user call requests received by the phone tree traversal system 100, calls placed by the pone tree traversal system 100, and the like. The information in the historical database 140 may be organized based on different users of the phone tree traversal system 100. The information collected within the historical database 140 can be aggregated to analyze trends and make decisions about updating the system 100.

In the illustrated embodiment, the phone tree traversal system 100 is distributed between the user computing device 102 and the remote server(s) 104. References herein to one or more processors of the phone tree traversal system 100 may refer to the processor(s) 118 of the user computing device 102 only, the processor(s) 132 of the remote server(s) 104 only, or both the processor(s) 118 and the processor(s) 132. Furthermore, although the databases 136, 138, 140 are shown in FIG. 1 in the memory 134 of the remote server(s) 104, at least some of the information of the databases 136, 138, 140 may be stored locally in the memory 120 of the user computing device 102. In an alternative embodiment, the phone tree traversal system 150 is defined by the components of the user computing device 102 alone (e.g., the processor(s) 118 and the memory 120), without using the remote server(s) 104.

Figure 2:
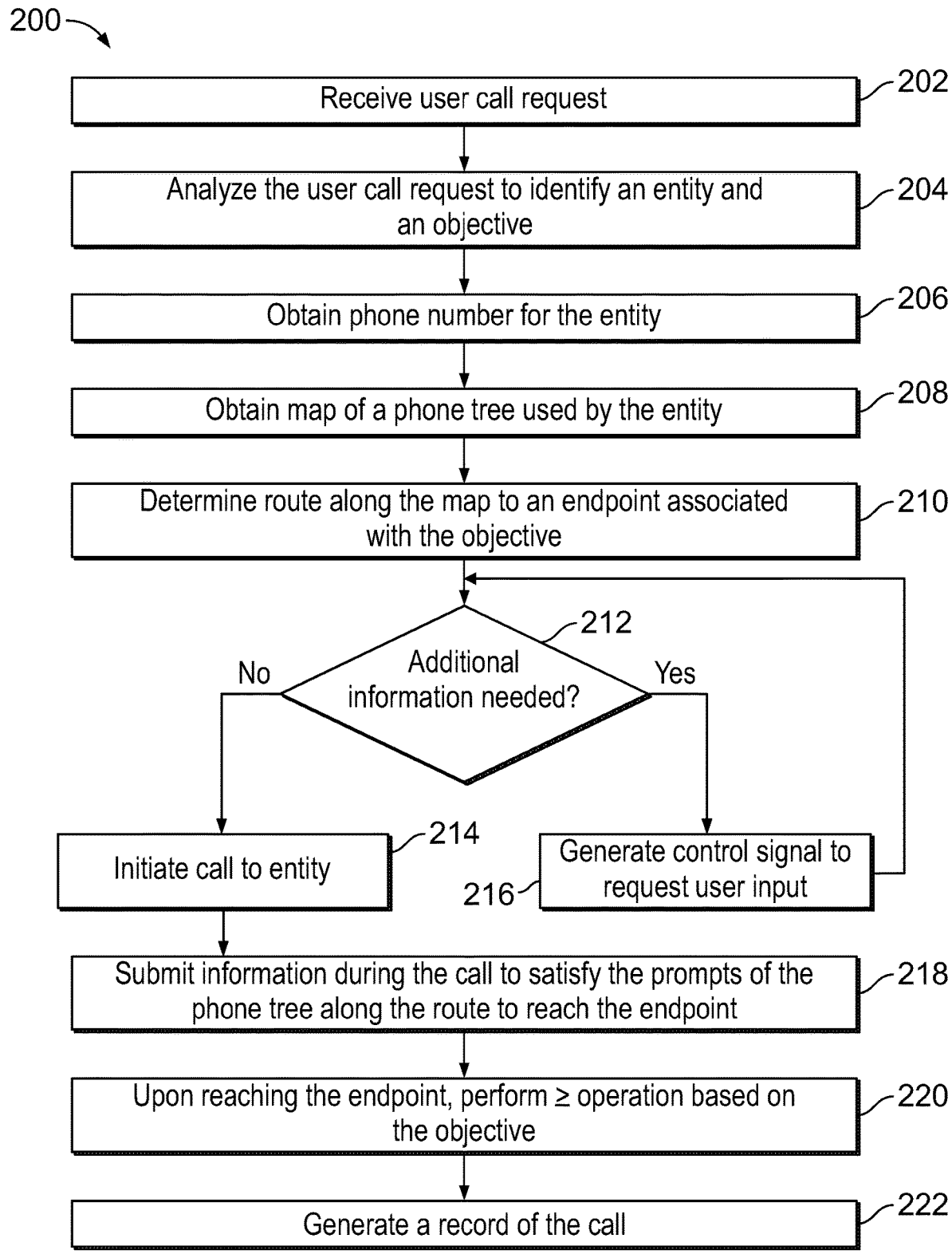
FIG. 2 is a flow chart of a method of traversing a phone tree by an automated system during a call according to an embodiment.

FIG. 2 is a flow chart 200 of a method of traversing a phone tree of an automated call receiving system according to an embodiment. The method is performed by the phone tree traversal system 100 shown in FIG. 1. For example, the method is performed at least in part by the one or more processors 118 of the user computing device 102. Some aspects of the method may be performed by the one or more processors 132 of the remote server(s) 104 which are communicatively connected to the user computing device 102, such as operations related to retrieving information from databases. The method optionally may include at least one additional step than shown, at least one fewer step than shown, and/or at least one different step than shown.

At step 202, the one or more processors of the phone tree traversal system 100 receive a user call request. The user call request is a submission by a user (e.g., a person) that commands the phone tree traversal system 100 to make a call to an entity for a specific objective. The user may submit the user call request by text or selection of virtual buttons of a GUI utilizing the touch input device 112. Alternatively, the user may submit the user request by voice utilizing the microphone of the audio input and output device 108 of the user computing device 102. The entity of the user call request may be one of various business entities, such as a bank, a credit card company, a department store, a restaurant, a salon, an insurance company, a company that communicates movie showtimes, and/or the like. The objective of the call is also variable, and can include checking an account balance, updating personal information stored at the entity, requesting an appointment or reservation, reaching a specific department or individual at the entity, paying a bill, receiving movie showtimes at one or more local theatres, and/or the like. The user call request is forwarded to the one or more processors of the system 100 for analysis.

At step 204, the one or more processors of the phone tree traversal system 100 analyze the user call request that is received to identify the entity to call and the objective of the call. For example, if the user call request is input by voice, the one or more processors may transcribe audio of the user call request to text (e.g., data) and analyze the text to identify the entity to call and the objective of the call. The interpretation may include parsing the audio request into a series of signal segments associated with known words and phrases in a database. The processors may extract relevant information related to the entity and the objective from the signal segments. In an embodiment, the processors may employ machine learning to improve the accuracy of interpreting the user call request, relative to conventional processing systems that do not use machine learning techniques. The analysis and interpretation of the user call request may be performed by the one or more processors 118 of the user computing device 102 or offloaded to the one or more processors 132 of the remote server(s) 104.

After identifying the entity, the processors of the phone tree traversal system 100 look up information about the entity that is necessary for the impending call. For example, at step 206, the processors obtain a phone number for the entity. The phone number may be obtained by retrieving a stored phone number for the entity from the entity database 138 at the remote server(s) 104. For example, the processors 132 may compare the entity from the user call request to the list of entities stored in the entity database 138 to determine if the phone number is in the entity database 138. Optionally, if the phone number is not in the entity database 138, the processors may search for the phone number of the entity on the Internet. If the processors are not able to locate a phone number for the entity, then the processors may generate a control signal for prompting the user to manually input a phone number for the entity into the user computing device.

Furthermore, at step 208, the one or more processors of the phone tree traversal system 100 obtain a map of a phone tree utilized by an automated call receiving system 126 of the entity. The automated call receiving system 126 is used to greet callers and direct the callers to different extensions of the entity, without using a human operator. The different extensions may be associated with different departments, different automated applications (e.g., reservation system, account balance system, bill payment system, etc.), different individuals, and the like. The phone tree includes at least one node with multiple path segments that branch from the node. Each node includes a respective prompt. The prompt requests the caller for information. The phone tree is navigated or traversed by submitting appropriate information in response to each prompt. If the submitted information does not satisfy a prompt, the caller will not be able to proceed beyond that node, and therefore would be unlikely to satisfy the objective of the call.

Figure 3:
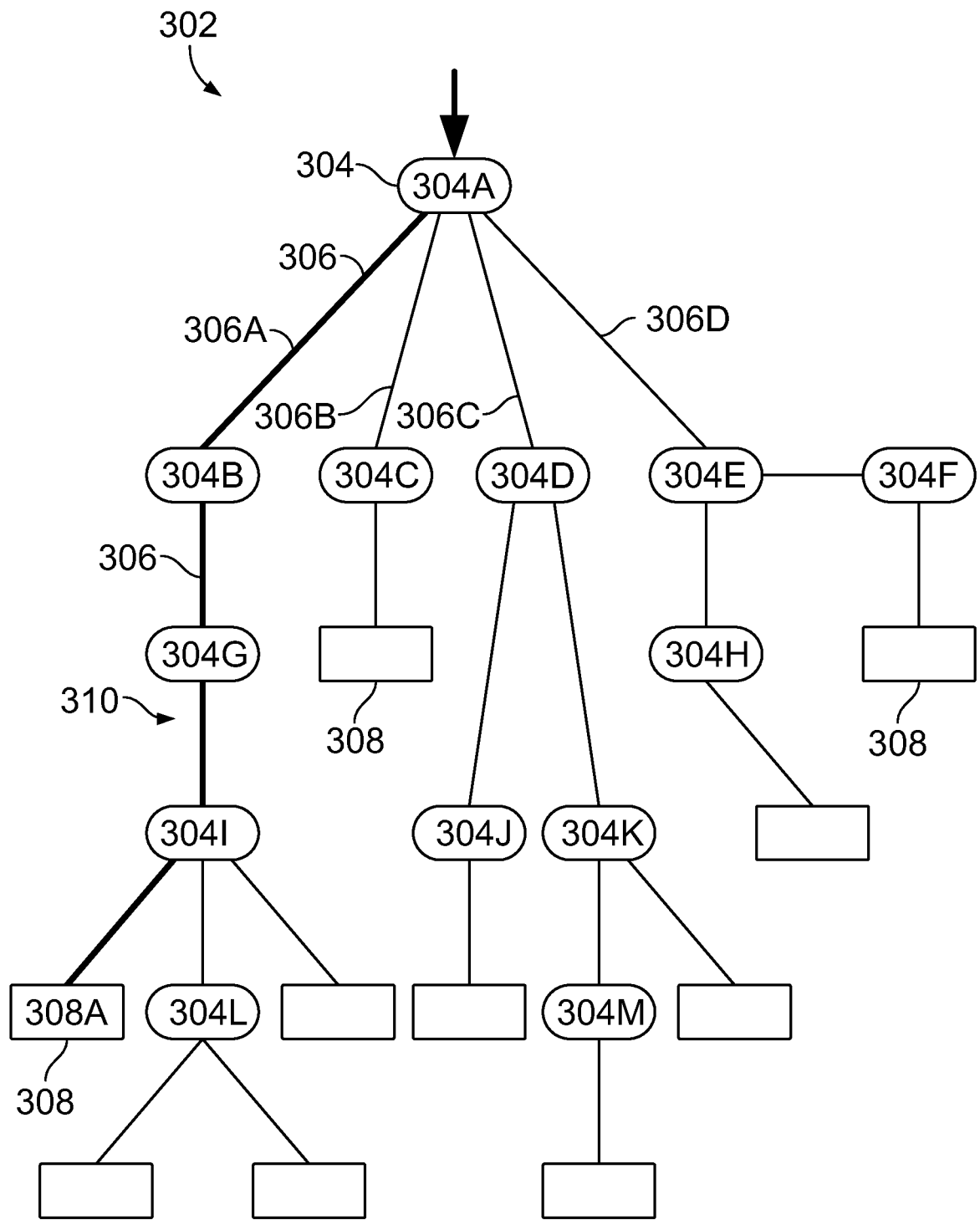
FIG. 3 illustrates an example template of a map of a phone tree.

FIG. 3 illustrates an example template of a map of a phone tree 302. The phone tree 302 includes a first node 304A with four path segments 306A-306D branching from the first node 304A. The first path segment 306A leads to a second node 304B; the second path segment 306B leads to a third node 304C; the third path segment 306C leads to a fourth node 304; and the fourth path segment 306D leads to a fifth node 304E. Each node 304 includes an associated prompt that requests information for making a decision, inputting facts, or the like. For example, the prompt at the first node 304A may request that the caller say or enter via the touch input device one of four different designated responses, such as "press 1 for questions about your account", "press 2 to pay a bill", "press 3 to speak with an agent", and the like. The call proceeds through the phone tree 302, from node 304 to node 304, based on the responses provided to the prompts. For example, if the caller submits "1" in the example above, the call may progress along the first path 306A to the second node 304B, where a new prompt is provided to the caller. Because the submission of "1" indicates that the caller has a question about their account, the prompt at the second node 304B may be related to the account. For example, the prompt may request the caller's account number, name, or the like. The prompt at the following node 304G may be intended to verify the caller's identity, such as by requesting a password, a PIN, the last four digits of the caller's social security number, the answer to a security question, or the like. After the caller is verified, the caller may be presented with at least one additional prompt at node 304I.

Each call progresses through the phone tree 302 along one of a plurality of different routes until the call reaches an endpoint 308 or the caller fails to supply an adequate response to the prompt at one of the nodes 304 along the route. At the endpoints 308, the automated call receiving system may provide information to the caller, such as an account balance or a confirmation, and/or may connect the caller with a person, such as an employee of the entity.

The one or more processors of the phone tree traversal system 100 may obtain the map of the phone tree that is utilized by the entity by retrieving the map from the entity database 138. Optionally, if there is no phone tree map stored in the entity database 138 for the requested entity, then the one or more processors may generate the map. In an embodiment, the processors may generate the map by performing one or more training calls to the entity to traverse different available routes through the phone tree of the automated call receiving system. Through the experience of traversing different routes, the processors essentially map out the anatomy of the phone tree. Optionally, the automated call receiving system may enable the processors to navigate the different routes of the phone tree unimpeded upon submission of a designated data key in response to each prompt. If no data key is known or available, then the processors may navigate the phone tree using a more basic "brute force" technique in which the processors attempt to provide legitimate responses to each of the prompts, and the processors notify the user for assistance in responding to the prompt when the processors are unable to proceed beyond a given node. After generating the map of the phone tree of the entity, the one or more processors may store the phone tree in the entity database 138 for future use by the user computing device 102 and other user computing devices that operate the TT application 122.

With continued reference to the FIG. 2, at step 210 the one or more processors of the phone tree traversal system 100 determine a route along the map that leads to an endpoint 308 of the phone tree 302 associated with the objective of the call. The one or more processors may examine the map of the phone tree 302 to determine which of the endpoints 308 is most appropriate for (e.g., has the highest likelihood of satisfying) the call objective of the user call request. For example, if the objective is to check the account balance in a checking account, the one or more processors may determine, based on the map of the phone tree, that the endpoint 308A would satisfy the objective. Optionally, the processors may utilize machine learning for matching the call objective to one of the available endpoints 308 of the phone tree. In an embodiment, if the processors are not able to match the objective to one of the available endpoints 308 of the phone tree, the processors may default to selecting the endpoint 308 that connects the call to an agent or representative of the entity. For example, the processors may default to speaking with an agent as the desired endpoint 308.

After identifying the specific endpoint 308A, the processors then determine, based on the map, a route 310 along the phone tree 302 that would lead to that endpoint 308A. For example, the processors may work backwards from the endpoint 308A to the beginning of the phone tree 302 to determine the route 310. The route 310 is shown in FIG. 3 as a thicker line. The route 310 in the illustrated example extends through the nodes 304A, 304B, and 304I. Other routes through the phone tree may extend through different nodes, more or less than three nodes, and the like. Each route extends through at least one node 304.

After determining the route 310, the one or more processors of the phone tree traversal system 100 at step 212 may determine whether the system 100 needs any additional information from the user. For example, the processors may use the map of the phone tree to analyze the prompts at each of the nodes along the route 310. The processors may interpret the prompts and identify which information is requested at each of the prompts. In an embodiment, step 212 may be performed prior to initiating the call to the entity, as a means to prepare for the call. Alternatively, the call may be placed prior to performing step 212, and the processors of the system 100 may interpret the prompts in real-time during the call. The processors may utilize machine learning to associate words or phrases with elements of information stored in the user database 136. For example, via machine learning, the processors may identify that prompts of different phone trees that include "DOB", "date of birth", and "birthday" all refer to the same element of information.

After identifying the element of information requested by each prompt along the determined route 310, the processors of the system 100 may search for the requested elements of information in the user database 136. If all of the information needed to traverse the route 310 is available from the user database 136, then flow of the method may proceed to step 214 to initiate the call to the entity. Some of the requested information may not be found in the user database 136 due to sensitivity of the information, incomplete population of the database 136, and/or an inability for the processors to interpret the prompt. For example, a user may not want to store certain private information, such as a SSN, within the user database 136 of the system 100. If the processors determine that at least some additional information is needed, then flow of the method proceeds to step 216 prior to initiating the call.

At step 216, the processors of the phone tree traversal system 100 may generate a control signal to alert the user that user input is requested. The control signal may control the display device 114 of the user computing device 102 to display a text message. The text message may describe the element of information that is needed and/or the prompt that is indecipherable. Alternatively, the control signal may control the speaker(s) of the audio input and output device 108 to emit an alert. The user may open the TT application 122 on the user computing device 102 to submit the requested information and/or may respond with a voice message that is received via the microphone(s) of the audio device 108. If the additional information is sensitive (e.g., a SSN), then the processors may only store the information in a temporary memory that will be erased after the call. Optionally, the user may refuse to provide sensitive information to the system 100, even when prompted at step 216. In such case, the processors of the system 100 may proceed with the algorithm and prompt the user again for such sensitive information during the call when the automated call receiving system 126 requests such information.

At step 214, the processors of the phone tree traversal system 100 control the communication device 110 of the user computing device 102 to initiate the call with the entity. For example, the processors may dial the phone number for the entity that is obtained at step 206. In an embodiment, the call may be initiated automatically upon the determination at step 212 that the system 100 has the necessary information. As such, the only actions taken by the user may be inputting the user call request and potentially responding to any requests for additional information at step 216. Alternatively, the system 100 may prompt the user to provide a discrete call initiation input prior to calling the entity.

During the call, the phone tree traversal system 100 communicates with the automated call receiving system 126 to navigate the phone tree 302. At step 218, in response to each prompt, the one or more processors 118 of the user computing device 102 may submit information to traverse the phone tree 302 along the route 310 towards the selected endpoint 308A. The processors 118 may submit the information by controlling the speaker(s) of the audio device 108 to emit computer-generated speech, specific tones, or prerecorded sound bites. Optionally, the processors 118 may submit the information in the form of data messages communicated over the network 128.

In an embodiment, the user may not participate in the call while the phone tree traversal system 100 communicates with the automated call receiving system 126, at least not unless the user is needed. The processors of the system 100 submit all or at least some of the information responsive to the prompts without input from the user. For example, in preparation for the call, the processors of the system 100 may collect the elements of information from the user database 136 that are needed to traverse the route 310 into a temporary storage device, such as RAM memory. In response to each prompt, the processors identify the element of information that is requested, retrieve the element of information from the temporary storage device or the user database 136, and then control the user computing device 102 to submit the element of information along the communication pathway of the call.

During the call, each respective prompt may be received as an audio signal of computer-generated speech or prerecorded speech. To be clear, the phone tree traversal system 100 interacts with the same automated call receiving system 126 that the user would have to interact with had the user called the entity. The one or more processors of the system 100 interpret the audio signal and determine an element of information that is requested by the respective prompt. The one or more processors then search for the element of information within a memory device, such as the temporary storage device of the memory 120 on the user computing device 102 or the user database 136 of the memory 134 at the remote server(s) 104. In response to finding the element of information within the memory device, the processors automatically submit the element of information to the automated call receiving system 126. On the other hand, if the element of information is not able to be located within the memory device, the processors of the system 100 generate a control signal to prompt the user to input the missing element of information. The user may input information to the system 100 using the audio device 108, the touch input device 112, or the like, regardless of which input device the user utilize to generate the call request.

At step 220, upon reaching the designated endpoint 308A of the route 310 within the phone tree 302, the one or more processors of the phone tree traversal system 100 perform one or more operations based on the objective of the user call request. One operation may be to establish an audio connection with the audio device 108 of the user computing device 102 to enable the user to participate in the call. For example, the objective of the call is to speak to a person associated with the entity, such as to discuss a matter that is relatively complex and/or to ask questions. In that case, the objective may be to reach a certain individual or a person within a certain department, and the user may utilize the phone tree traversal system 100 to avoid interacting with the automated call receiving system 126 of the entity.

Another operation performed by the processors the system 100 after reaching the endpoint 308A may be to schedule an event with the automated call receiving system 126. For example, the processors may schedule an appointment, make a reservation for dinner, or the like. If the user specifies certain details in the objective, such as the desired date and time, the processors may autonomously interact with the call receiving system 126 to schedule the event if the event is available within the designated constraints of the objective.

A third operation that may be performed by the processors of the system 100 after reaching the endpoint 308A is to collect information from the entity and/or the automated call receiving system 126 thereof. For example, the processors may collect an account balance, movie showtimes at local theatres, and the like. The processors may control the display device 114 to present the information that is collected to the user in the form of text, and/or may control the speaker(s) of the audio device 108 to emit speech describing the information.

A fourth operation that may be performed by the processors of the system 100 is to update information stored by the entity. For example, if the user desires updating the user's residence address in the record of the entity, upon reaching the endpoint 308 associated with editing user contact information, the processors may automatically submit the updated residence information. In this example, other than formulating the user call request, the user may not need to participate in the call. The user optionally may select to listen to the call between the automated systems or can completely ignore the call.

At step 222, the one or more processors of the system 100 may generate a record of the interaction with the automated call receiving system 126. The record may include a time stamp, information about the entity that is the call receiving party, and details about the information that was provided between the systems. The record may by stored in the historical database 140. Optionally, the record may be made available to the user. For example, the user may utilize the GUI of the TT application 122 to access records of all of the calls made by the phone tree traversal system 100 on behalf of the user.

The phone tree traversal system and method described herein alleviates the stress, frustration, and difficulty experienced by people when calling entities that have automated call receiving systems. Another technical effect is that the phone tree traversal system and method may navigate through the phone tree of an entity faster than a person would by eliminating the risk of human error and slow human processing and input speeds. To be clear, the phone tree traversal system is not merely automating a process conventionally performed by humans. For example, the system determines the phone tree for the call receiving system in advance and plots a route through the phone tree that leads to a specific endpoint in the phone tree associated with a call objective. A person would simply call the entity, listen to the options and prompts as they are presented during the call, and respond accordingly, without mapping out the phone tree or determining the route in advance of the call. The phone tree traversal system and method provides an algorithm that could not be performed by a person.

Closing Statements

As will be appreciated by one skilled in the art, various aspects may be embodied as a system, method or computer (device) program product. Accordingly, aspects may take the form of an entirely hardware embodiment or an embodiment including hardware and software that may all generally be referred to herein as a "circuit," "module" or "system." Furthermore, aspects may take the form of a computer (device) program product embodied in one or more computer (device) readable storage medium(s) having computer (device) readable program code embodied thereon.

Any combination of one or more non-signal computer (device) readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a dynamic random access memory (DRAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection. For example, a server having a first processor, a network interface, and a storage device for storing code may store the program code for carrying out the operations and provide this code through its network interface via a network to a second device having a second processor for execution of the code on the second device.

Aspects are described herein with reference to the Figures, which illustrate example methods, devices and program products according to various example embodiments. These program instructions may be provided to a processor of a general purpose computer, special purpose computer, or other programmable data processing device or information handling device to produce a machine, such that the instructions, which execute via a processor of the device implement the functions/acts specified.

The program instructions may also be stored in a device readable medium that can direct a device to function in a particular manner, such that the instructions stored in the device readable medium produce an article of manufacture including instructions which implement the function/act specified. The program instructions may also be loaded onto a device to cause a series of operational steps to be performed on the device to produce a device implemented process such that the instructions which execute on the device provide processes for implementing the functions/acts specified.

The units/modules/applications herein may include any processor-based or microprocessor-based system including systems using microcontrollers, reduced instruction set computers (RISC), application specific integrated circuits (ASICs), field-programmable gate arrays (FPGAs), logic circuits, and any other circuit or processor capable of executing the functions described herein. Additionally, or alternatively, the units/modules/controllers herein may represent circuit modules that may be implemented as hardware with associated instructions (for example, software stored on a tangible and non-transitory computer readable storage medium, such as a computer hard drive, ROM, RAM, or the like) that perform the operations described herein. The above examples are exemplary only, and are thus not intended to limit in any way the definition and/or meaning of the term "controller." The units/modules/applications herein may execute a set of instructions that are stored in one or more storage elements, in order to process data. The storage elements may also store data or other information as desired or needed. The storage element may be in the form of an information source or a physical memory element within the modules/controllers herein. The set of instructions may include various commands that instruct the modules/applications herein to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Further, in the following claims, the phrases "at least A or B", "A and/or B", and "one or more of A and B" (where "A" and "B" represent claim elements), are used to encompass i) A, ii) B or iii) both A and B.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. A phone tree traversal system, comprising:
   an input device configured to receive a user call request;
   a memory configured to store program instructions; and
   one or more processors operably connected to the memory, wherein the program instructions are executable by the one or more processors to:
      analyze the user call request to identify an entity to call and an objective of the call;
      obtain a map of a phone tree utilized by an automated call receiving system of the entity to direct incoming calls to different extensions of the entity, the phone tree including at least one node with multiple path segments that branch from the node, and each node includes a respective prompt;
      determine a route along the map to an endpoint of the phone tree associated with the objective of the call, the route extending through one or more nodes of the phone tree;
      analyze the prompts at the one or more nodes along the route, prior to the call, to determine one or more elements of information requested by the prompts;
      search for the one or more elements of information within the memory or another memory device;
      responsive to not finding a first element of information of the one or more elements of information within the memory or the other memory device, generate a control signal to request a user to input the first element of information prior to initiating the call; and
      during the call with the entity, navigate the phone tree to reach the endpoint by submitting the elements of information in response to receiving the respective prompts at the one or more nodes along the route.

2. The phone tree traversal system of claim 1, wherein, during the call and in response to the respective prompt, the one or more processors submit a corresponding element of information to the automated call receiving system without input from a user.

3. The phone tree traversal system of claim 1, wherein the one or more processors execute the program instructions to generate the map by performing one or more training calls to the entity, prior to the call, to traverse different available routes through the phone tree.

4. The phone tree traversal system of claim 1, wherein the one or more processors execute the program instructions to obtain the map by retrieving the map of the phone tree utilized by the entity from an entity database that includes multiple maps of different phone trees associated with different entities.

5. The phone tree traversal system of claim 1, further comprising a communication device configured to make telephone calls, and the one or more processors execute the program instructions to control the communication device to initiate the call with the entity by obtaining a phone number associated with the entity.

6. The phone tree traversal system of claim 1, wherein the input device includes a microphone and the user call request is provided by voice to the microphone, the one or more processors configured to transcribe audio of the user call request to text and analyze the text to identify the entity to call and the objective of the call.

7. The phone tree traversal system of claim 1, wherein, during the call the respective prompt at each node along the route is received as an audio signal of computer-generated speech or pre-recorded speech, and the one or more processors are configured to interpret the audio signal and determine the element of information that is requested by the respective prompt.

8. The phone tree traversal system of claim 1, wherein, in response to the user failing to input the first element of information upon generating the control signal prior to initiating the call, during the call the one or more processors are configured to automatically navigate the phone tree until reaching the node associated with the prompt that requests the first element of information, and then generate a second control signal to prompt the user to input the first element of information using the input device or another input device.

9. The phone tree traversal system of claim 1, wherein, upon reaching the endpoint of the phone tree, the one or more processors are configured to one or more of establish an audio connection with an audio device to enable the user to participate in the call, schedule an event with the automated call receiving system, collect information from the automated call receiving system, or update information stored by the entity.

10. The phone tree traversal system of claim 1, wherein after searching for the one or more elements of information within the memory or another memory device, the one or more processors are configured to store the elements of information obtained from the search in a temporary storage device prior to initiating the call.

11. The phone tree traversal system of claim 10, wherein, during the call in response to determining the element of information that is requested by one of the prompts, the one or more processors are configured to obtain the element of information from the temporary storage device and automatically submit the element of information.

12. A method comprising:
   analyzing, via one or more processors, a user call request received via an input device to identify an entity to call and an objective of the call;
   obtaining a map of a phone tree utilized by an automated call receiving system of the entity to direct incoming calls to different extensions of the entity, the phone tree including at least one node with multiple path segments that branch from the node, and each node includes a respective prompt;
   determining a route along the map to an endpoint of the phone tree associated with the objective of the call, the route extending through one or more nodes of the phone tree;

analyzing the prompts at the one or more nodes along the route, prior to the call, to determine one or more elements of information requested by the prompts;

searching for the one or more elements of information within the memory or another memory device;

responsive to not finding a first element of information of the one or more elements of information within the memory or the other memory device, generating a control signal to prompt a user to input the first element of information prior to initiating the call; and during the call with the entity, navigating the phone tree to reach the endpoint by submitting the elements of information in response to receiving the respective prompts at the one or more nodes along the route.

13. The method of claim 12, wherein searching for the one or more elements of information comprises storing the one or more elements of information that are found within a user database, and navigating the phone tree during the call comprises retrieving the elements of information from the user database in response to receiving the respective prompts and submitting the elements of information to the automated call receiving system without user input.

14. The method of claim 12, further comprising generating the map of the phone tree by performing one or more training calls to the entity prior to the call.

15. The method of claim 12, wherein obtaining the map of the phone tree comprises retrieving the map of the phone tree utilized by the entity from an entity database that includes multiple maps of different phone trees associated with different entities.

16. The method of claim 12, wherein during the call the respective prompt at each node along the route is received as an audio signal of computer-generated speech or pre-recorded speech, and the method comprises interpreting the audio signal and determining the element of information that is requested by the respective prompt.

17. The method of claim 12, wherein searching for the one or more elements of information within the memory or the other memory device comprises storing the elements of information obtained from the search in a temporary storage device prior to initiating the call; and navigating the phone tree during the call includes obtaining the elements of information from the temporary storage device in response to receiving the prompts along the route, and automatically submitting the elements of information to the automated call receiving system.

18. The method of claim 12, wherein, upon reaching the endpoint of the phone tree, the method comprises one or more of establishing an audio connection with an audio device to enable the user to participate in the call; scheduling an event with the automated call receiving system; collecting information from the automated call receiving system; or updating information stored by the entity.

19. A computer program product comprising a non-transitory computer readable storage medium, the non-transitory computer readable storage medium comprising computer executable code configured to be executed by one or more processors to:

analyze a user call request received via an input device to identify an entity to call and an objective of the call;

obtain a map of a phone tree utilized by an automated call receiving system of the entity to direct incoming calls to different extensions of the entity, the phone tree including nodes with multiple path segments that branch from each of the nodes, and each node includes a respective prompt;

determine a route along the map to an endpoint of the phone tree associated with the objective of the call, the route extending through one or more nodes of the phone tree;

analyze the prompts at the one or more nodes along the route, prior to the call, to determine one or more elements of information requested by the prompts;

search for the one or more elements of information within a user database;

store the elements of information obtained from the user database in a temporary storage device prior to initiating the call; and during the call with the entity, navigate the phone tree to reach the endpoint by determining that the respective prompt at a first node along the route requests a first element of information, obtaining the first element of information from the temporary storage device, and submitting the first element of information to the automated call receiving system without input from a user.

20. The program product of claim 19, wherein, in response to not finding a second element of information within the user database, the computer executable code is further configured to be executed by the one or more processors to generating a control signal to notify the user and request that the user input the second element of information prior to initiating the call.

* * * * *